(12) United States Patent
Livshiz et al.

(10) Patent No.: US 7,885,756 B2
(45) Date of Patent: Feb. 8, 2011

(54) MULTI-PULSE SPARK IGNITION DIRECT INJECTION TORQUE BASED SYSTEM

(75) Inventors: Michael Livshiz, Ann Arbor, MI (US); Jeffrey M. Kaiser, Highland, MI (US); Christopher R. Graham, Lake Orion, MI (US); Christopher E. Whitney, Highland, MI (US); Robert Francis Semrau, Ovid, MI (US); Brian D Francis, Fenton, MI (US)

(73) Assignee: GM Global Technologies Operations, Inc.

( * ) Notice: Subject to any disclaimer, the term of this patent is extended or adjusted under 35 U.S.C. 154(b) by 98 days.

(21) Appl. No.: 12/436,362

(22) Filed: May 6, 2009

(65) Prior Publication Data

US 2010/0057329 A1    Mar. 4, 2010

Related U.S. Application Data

(60) Provisional application No. 61/190,471, filed on Aug. 28, 2008, provisional application No. 61/171,535, filed on Apr. 22, 2009, provisional application No. 61/173,785, filed on Apr. 29, 2009.

(51) Int. Cl.
*B60T 7/12* (2006.01)
*F02B 3/00* (2006.01)

(52) U.S. Cl. .................. 701/105; 123/299; 123/305; 123/406.23; 123/406.49

(58) Field of Classification Search ......... 701/103–106, 701/114, 115; 123/299, 300, 304, 305, 321, 123/322, 345–348, 406.23, 406.25, 406.49, 123/406.55, 406.68, 406.7
See application file for complete search history.

(56) References Cited

U.S. PATENT DOCUMENTS

| | | | |
|---|---|---|---|
| 5,444,976 A | 8/1995 | Gonze | |
| 6,598,589 B2 | 7/2003 | Freland | |
| 6,704,638 B2 | 3/2004 | Livshiz | |
| 6,938,412 B2 | 9/2005 | Li | |
| 7,021,282 B1 | 4/2006 | Livshiz | |
| 7,234,440 B2 * | 6/2007 | Hilditch | ........... 123/305 |
| 7,463,970 B2 | 12/2008 | Livshiz | |
| 2008/0098969 A1 * | 5/2008 | Reed et al. | ........... 123/64 |
| 2008/0251044 A1 * | 10/2008 | Riley et al. | ........ 123/188.8 |
| 2008/0251746 A1 * | 10/2008 | Riley et al. | ........ 251/129.06 |
| 2009/0193795 A1 * | 8/2009 | Cleary et al. | ........... 60/295 |

* cited by examiner

*Primary Examiner*—John T Kwon

(57) ABSTRACT

A control system is provided and includes a catalyst module that generates a multi-mode enable signal based on a catalyst light off enable signal. A transition control module controls transitions between a single pulse mode and multi-pulse mode based on the multi-mode enable signal. The transition control module receives a first torque signal and generates a second torque signal based on the first torque signal. The engine torque control module generates an air per cylinder signal, a throttle area signal, and a spark timing signal based on the second torque signal. The single pulse mode is associated with a single fuel injection pulse per combustion cycle. The multi-pulse mode is associated with multiple fuel injection pulses per combustion cycle.

20 Claims, 5 Drawing Sheets

MULTI-PULSE SPARK IGNITION DIRECT INJECTION TORQUE BASED SYSTEM

CROSS-REFERENCE TO RELATED APPLICATIONS

This application claims the benefit of U.S. Provisional Application No. 61/190,471, filed on Aug. 28, 2008. The disclosures of the above application is incorporated herein by reference in its entirety.

This application is related to U.S. Provisional Application No. 61/171,535, filed Apr. 22, 2009 and U.S. Provisional Application No. 61/173,785, filed on Apr. 29, 2009.

FIELD OF THE INVENTION

The present invention relates to engine control systems and more particularly to coordinated torque control based techniques for multi-pulse direct injection operation and transitioning.

BACKGROUND OF THE INVENTION

The statements in this section merely provide background information related to the present disclosure and may not constitute prior art.

Traditional engine control systems are limited in accurately controlling engine torque output. The traditional engine control systems are also slow to respond to received control signals and limited in coordinate engine torque control with respect to various devices that affect engine torque output.

Powertrain control systems include various modules that require a certain amount of engine torque to operate properly. For example, an automatic transmission control module may need to momentarily reduce torque from the engine in order to change transmission gears. Another example is an air conditioning clutch control module that needs a momentary increase in engine torque before engaging an air conditioning compressor clutch. The engine torque increase helps maintain a constant engine speed when the compressor clutch engages, such as when the engine is idling.

Traditionally, the various modules affect torque actuators directly. For example, the automatic transmission control module may retard a spark advance to the engine to reduce the engine torque during the shift. Similarly, the air conditioning clutch control module may increase the spark advance to increase the engine torque during the moment prior to engaging the compressor clutch.

As vehicle powertrain systems include more modules and more actuators that affect torque, the architecture of the prior art becomes cumbersome to maintain and undesirably difficult to troubleshoot. As an example of more actuators, hybrid vehicles include an engine and an electric motor that provide torque. Integrating the hybrid vehicle powertrain to existing torque-modifying modules can be undesirably cumbersome with traditional powertrain control architectures.

Coordinated torque control (CTC) systems have been developed to accurately control engine output torque. An example torque control system is disclosed in commonly assigned U.S. Pat. No. 7,021,282 ("Coordinated Engine Torque Control"), which is herein incorporated by reference in its entirety. CTC systems provide a rapid response to control signals and coordinate engine torque control based on various devices that affect engine torque output.

SUMMARY OF THE INVENTION

In one embodiment, a control system is provided and includes a catalyst module that generates a multi-mode enable signal based on a catalyst light off enable signal. A transition control module controls transitions between a single pulse mode and multi-pulse mode based on the multi-mode enable signal. The transition control module receives a first torque signal and generates a second torque signal based on the first torque signal. The engine torque control module generates an air per cylinder signal, a throttle area signal, and a spark timing signal based on the second torque signal. The single pulse mode is associated with a single fuel injection pulse per combustion cycle. The multi-pulse mode is associated with multiple fuel injection pulses per combustion cycle.

In other features, a control system is provided that includes a catalyst module, which generates a multi-mode enable signal based on a catalyst light off enable signal. A torque reserve module selectively operates in one of the single pulse mode and the multi-pulse mode based on the multi-mode enable signal. The torque reserve module generates a torque reserve signal based on operation in one of the single pulse mode and the multi-pulse mode. An engine torque control module generates an air per cylinder signal, a throttle area signal, and a spark timing signal based on a torque request signal that is generated based on the torque reserve signal.

In other features, a control system is provided that includes a catalyst module that generates a multi-mode enable signal based on a catalyst light off enable signal. An engine torque estimator selectively operates in one of the single pulse mode and the multi-pulse mode based on the multi-mode enable signal. The engine torque estimator generates a torque sensitivity vector based on operation in one of the single pulse mode and the multi-pulse mode. An engine torque control module generates an air per cylinder signal, a throttle area signal, and a spark timing signal based on the torque sensitivity vector.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
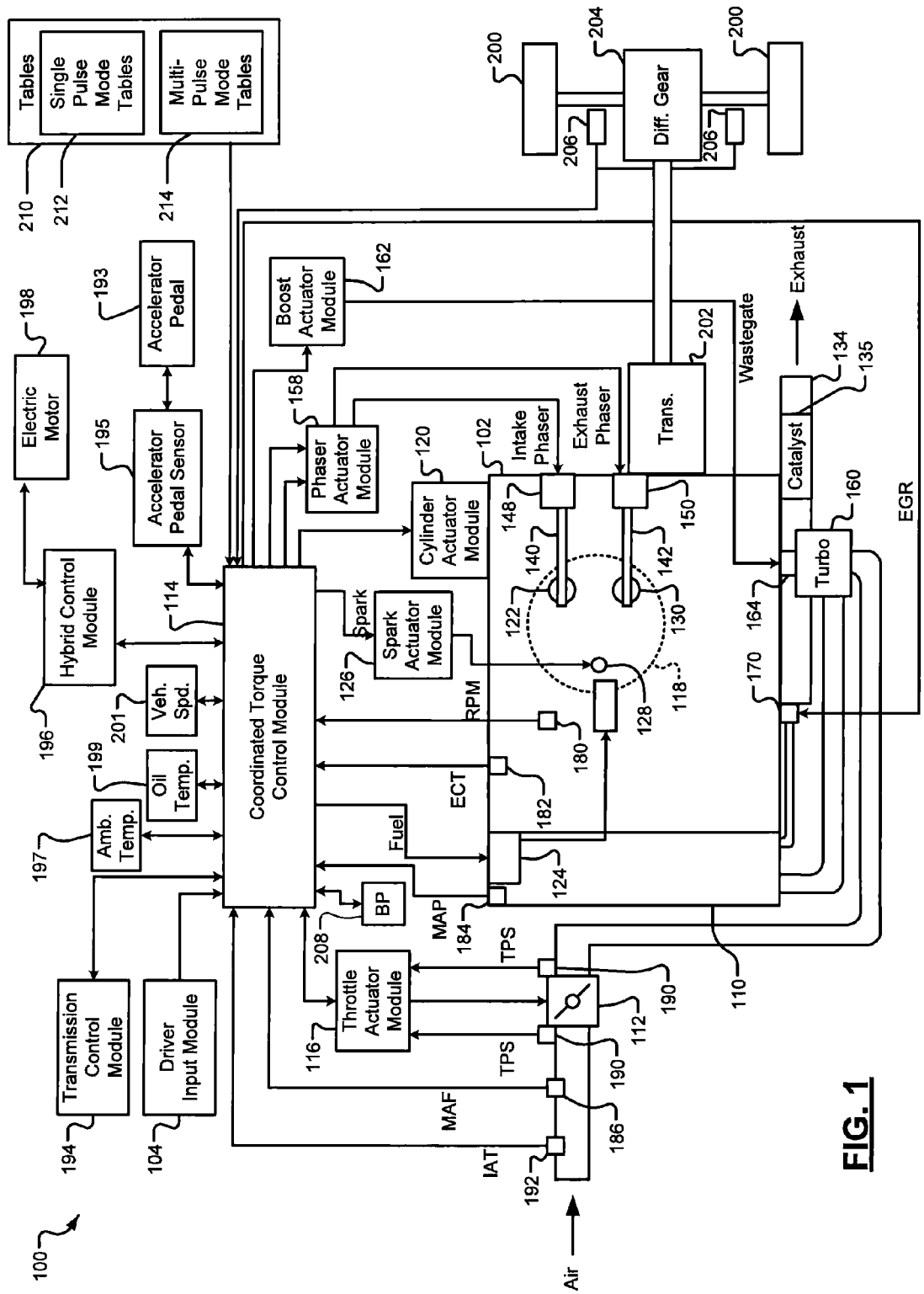
FIG. 1 is a schematic illustration of an exemplary coordinated torque control (CTC) system incorporating fuel injection mode transitioning for catalyst light off according to an embodiment of the present disclosure.

In the following description, different fuel injection pulse modes are described. Transitions between the fuel injection pulse modes may be performed based on performance of a catalyst light off (CLO). Catalyst light off refers to the quick heating of a catalyst of an exhaust system. A catalyst has an associated temperature operating range in which the catalyst is effective in reducing tailpipe hydrocarbon, carbon monoxide, and oxides of nitrogen emissions. By quickly heating the catalyst up to a temperature within the temperature operating range, tailpipe emissions are minimized.

A first fuel injection pulse mode, referred to as a single pulse mode, includes the injecting of a single pulse of fuel into a combustion chamber during a combustion cycle. A combustion cycle may, for example, in a 4-stroke engine, refer to a single sequencing through the 4 strokes (intake, compression, ignition, and exhaust). A single pulse mode may be used when an engine is not requiring maximum CLO.

A second fuel injection pulse mode, referred to as a multi-pulse mode, includes the injecting of two or more pulses of fuel into a combustion chamber during a combustion cycle. In one embodiment, two pulses of fuel are injected into a combustion chamber during a combustion cycle. The use of the multi-pulse mode allows for emission output control without the use of an air pump. An air pump is commonly used to inject oxygen-rich air into an exhaust system to support oxidation of exhaust gas and thus heating of a catalyst. For a double-pulse mode, a first injection may be provided at normal crankshaft angles to provide an initial homogeneous lean mixture. A second injection may be provided late in a compression stroke. For example only, the first pulse may provide a lean homogeneous mixture and the second pulse may provide additional fuel near the spark plug for strong ignition resulting in a more complete combustion of the combined charge.

The multi-pulse mode in combination with retarded spark (ignition) timing allows an engine to emit low hydrocarbon emissions while the catalyst is cold and inactive while transferring energy from a burning charge into thermal energy in the exhaust. This heats up the catalyst quickly with minimal passing of unburned hydrocarbons into the catalyst while the catalyst is operating in an inefficient state.

Coordinated torque control systems have been developed for spark ignition direct injection (SIDI) engines for a single pulse-based combustion cycle. An example coordinated torque control system is disclosed in commonly assigned U.S. Pat. No. 7,021,282 ("Coordinated Engine Torque Control"), which is herein incorporated by reference in its entirety. To support coordinated torque control, other systems have been developed, such as for torque estimation and torque based speed control. Examples of the torque estimation and torque based speed control systems are disclosed in commonly assigned U.S. Pat. No. 6,704,638 and in U.S. Pat. No. 7,463,970, which are herein incorporated by reference in their entirety. The following embodiments may be performed in both speed and torque control modules.

The following described embodiments provide a coordinated torque control architecture for operation in single and/or multi-pulse modes. Control techniques are also described for the transitioning between the single and multi-pulse modes.

The following description of the preferred embodiments is merely exemplary in nature and is in no way intended to limit the invention, its application, or uses. For purposes of clarity, the same reference numbers will be used in the drawings to identify the same elements.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

In addition, although the following embodiments are described primarily with respect to example internal combustion engines, the embodiments of the present disclosure may apply to other internal combustion engines. For example, the present invention may apply to spark ignition, homogenous spark ignition, homogeneous charge compression ignition, stratified spark ignition, and spark assisted compression ignition engines.

In the below-described embodiments, displacement on demand and/or cylinder deactivation may refer to the disabling of spark and/or fuel injection into a cylinder. When a cylinder is disabled spark and/or fuel may be disabled for that cylinder. This prevents combustion within that cylinder. The disabling of a cylinder may also or alternatively include retarding spark of a cylinder. Retarding spark refers to the delaying of spark timing such that spark for a cylinder occurs after top-dead-center (TDC).

Referring now to FIG. 1, a CTC system 100 that incorporates fuel injection mode transitioning for CLO is shown. The CTC system 100 may be configured for a hybrid electric vehicle and/or for a SIDI engine. Although the following embodiment is directed to a hybrid vehicle, the embodiments disclosed herein may be applied to non-hybrid vehicles. The CTC system 100 includes an engine 102 that combusts an air/fuel mixture to produce drive torque for a vehicle based on a driver input module 104. Air is drawn into an intake manifold 110 through a throttle valve 112. A main control module 114, which may be referred to as an engine control module, commands a throttle actuator module 116 to regulate opening of the throttle valve 112 to control the amount of air drawn into the intake manifold 110.

Figure 2:
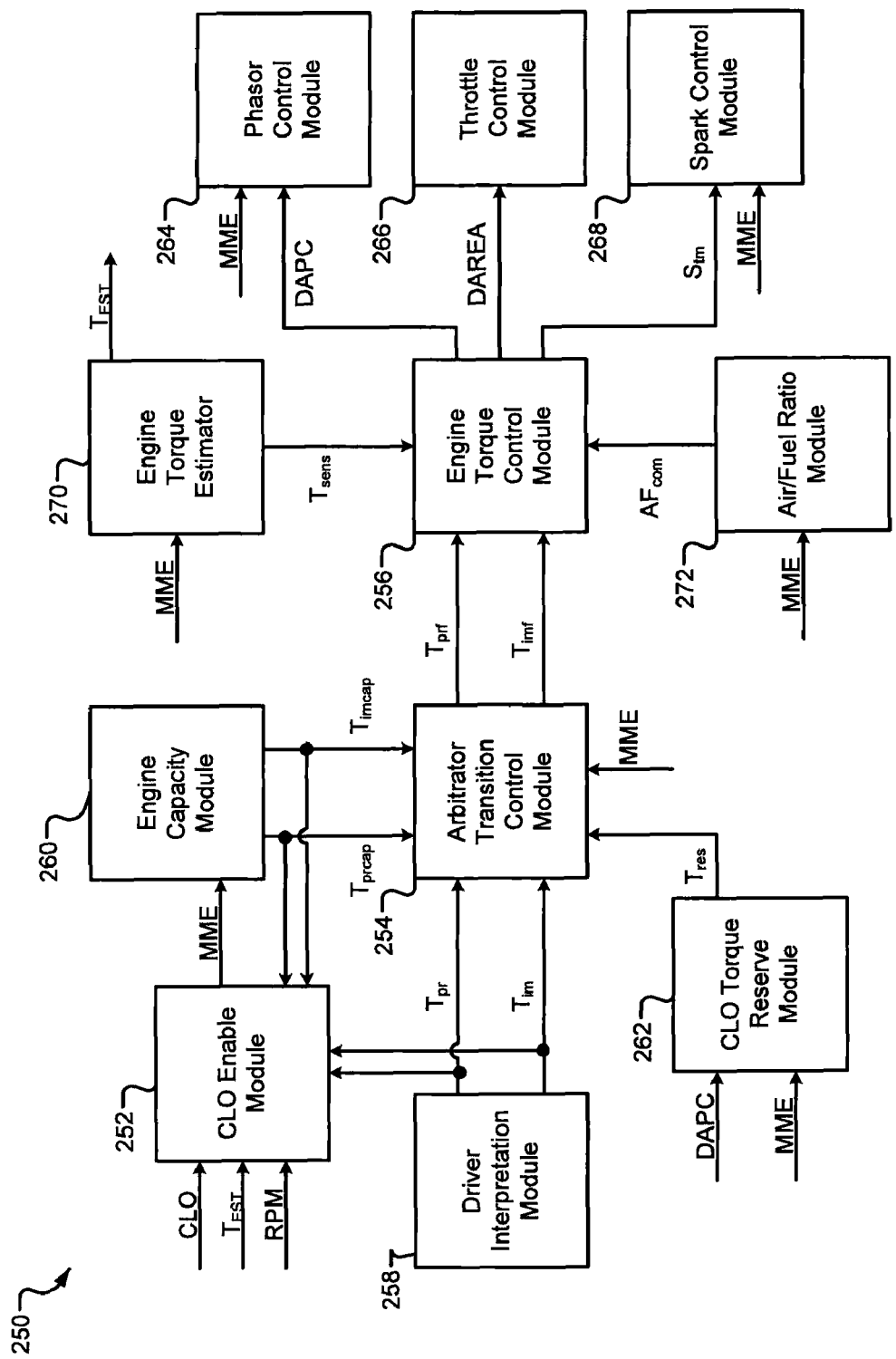
FIG. 2 is a functional block diagram of a CTC system according to an embodiment of the present disclosure.
Figure 3A:
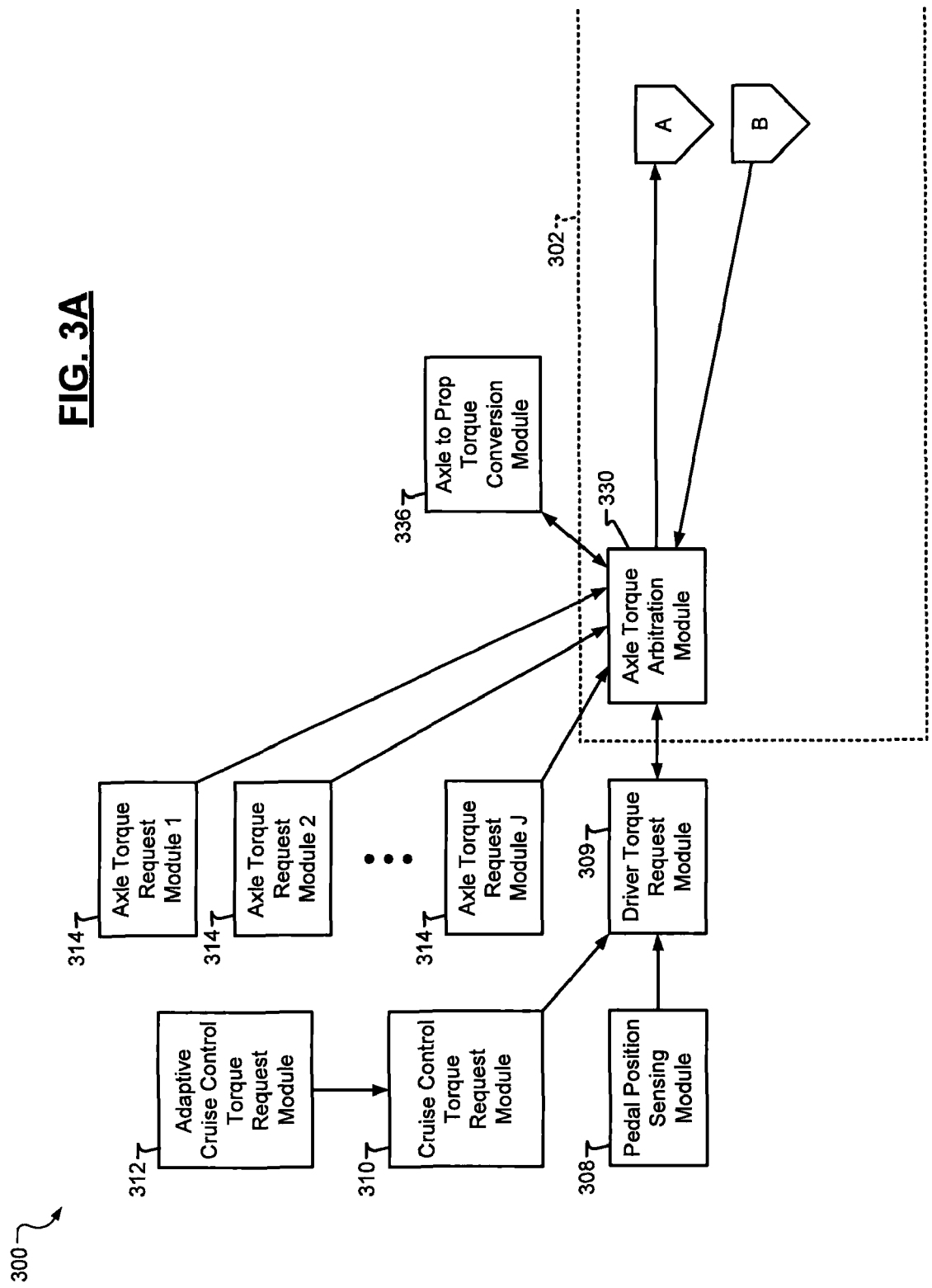
FIG. 3A is a functional block diagram of an exemplary engine control system according to the principles of the present disclosure.
Figure 3B:
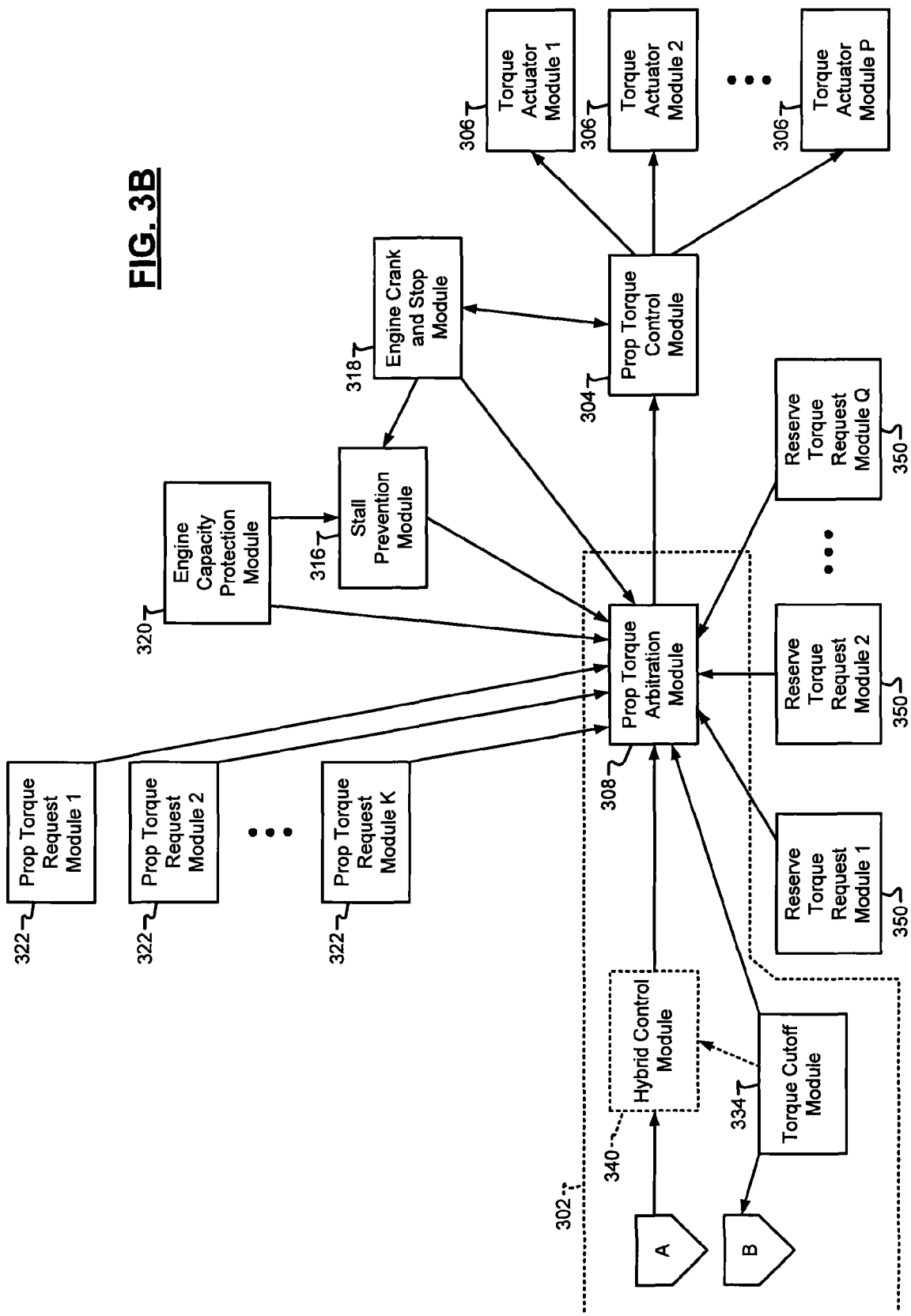
FIG. 3B is a continuation of the functional block diagram of FIG. 3A.

Other example CTC systems are shown and described with respect to the embodiments of FIGS. 2 and 3A and 3B. The CTC system 10 and/or the CTC module 114 of FIG. 1 may include one or more of the modules of FIGS. 2 and 3A and 3B.

Air from the intake manifold 110 is drawn into cylinders of the engine 102. The engine 102 may include any number of cylinders. The CTC module 114 may instruct a cylinder actuator module 120 to selectively deactivate some of the cylinders to improve fuel economy.

Air from the intake manifold 110 is drawn into the cylinder 118 through an intake valve 122. The CTC module 114 controls the amount of fuel injected by a fuel injection system 124 that includes one or more fuel injectors 125. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders, as shown.

The injected fuel mixes with the air and creates the air/fuel mixture in the cylinder 118. A piston (not shown) within the cylinder 118 compresses the air/fuel mixture. Based upon a signal from the CTC module 114, a spark actuator module 126 energizes a spark plug 128 in the cylinder 118, which ignites the air/fuel mixture. The timing of the spark may be specified relative to the crankshaft angle when the piston is at its topmost position, referred to as to top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134. Exhaust passes through a catalyst 135.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by halting provision of fuel and spark and/or disabling their exhaust and/or intake valves.

A CTC module 114 may regulate the position of the intake valve 122 and/or the exhaust valve 130 to regulate the quantity of air ingested and inert residual gases retained in the cylinder(s) 118. The CTC module 114 may also adjust operation of the fuel injector(s) 125, such as ON time or size of injector openings, to increase the amount of fuel injected into the cylinder(s) 118. The CTC module 114 may also adjust the timing of the exhaust camshaft(s) corresponding to the change in the A/F mixture.

The crankshaft angle at which the intake valve 122 is opened may be varied with respect to piston TDC by an intake cam phasor 148. The crankshaft angle at which the exhaust valve 130 is opened may be varied with respect to piston TDC by an exhaust cam phasor 150. A phasor actuator module 158 controls the intake cam phasor 148 and the exhaust cam phasor 150 based on signals from the ECM 114.

The CTC system 100 may include a boost device that provides pressurized air to the intake manifold 110. For example, FIG. 1 depicts a turbocharger 160. The turbocharger 160 is powered by exhaust gases flowing through the exhaust system 134, and provides a compressed air charge to the intake manifold 110. The turbocharger 160 may compress air before the air reaches the intake manifold 110.

A wastegate 164 may allow exhaust gas to bypass the turbocharger 160, thereby reducing the turbocharger's output (or boost). The CTC module 114 controls the turbocharger 160 via a boost actuator module 162. The boost actuator module 162 may modulate the boost of the turbocharger 160 by controlling the position of the wastegate 164. The compressed air charge is provided to the intake manifold 110 by the turbocharger 160. An intercooler (not shown) may dissipate some of the compressed air charge's heat, which is generated when air is compressed and may also be increased by proximity to the exhaust system 134. Alternate engine systems may include a supercharger that provides compressed air to the intake manifold 110 and is driven by the crankshaft.

The CTC system 100 may include an exhaust gas recirculation (EGR) valve 170, which selectively redirects exhaust gas back to the intake manifold 110. In various implementations, the EGR valve 170 may be located after the turbocharger 160. The CTC system 100 may measure the speed of the crankshaft in revolutions per minute (RPM) using an engine speed sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186. The MAF sensor 186 may be located in a housing that includes the throttle valve 112.

The throttle actuator module 116 may monitor the position of the throttle valve 112 using one or more throttle position sensors (TPS) 190. The ambient temperature of air being drawn into the CTC system 100 may be measured using an intake air temperature (IAT) sensor 192. The CTC module 114 may use signals from the sensors to make control decisions for the CTC system 100.

The CTC module 114 may communicate with a transmission control module 194 to coordinate shifting gears in a transmission (not shown). For example, the main control module 114 may reduce torque during a gear shift. The CTC module 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, the CTC module 114, the transmission control module 194, and the hybrid control module 196 may be integrated into one or more modules.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position.

Similarly, the spark actuator module 126 can be referred to as an actuator, while the corresponding actuator position is an amount of spark advance. Other actuators include the boost actuator module 162, the EGR valve 170, the phasor actuator module 158, the fuel injection system 124, and the cylinder actuator module 120. The term actuator position with respect to these actuators may correspond to boost pressure, EGR valve opening, intake and exhaust cam phasor angles, air/fuel ratio, and number of cylinders activated, respectively.

While electric motor 198 may provide torque in series and/or in parallel with the torque output of engine 102, it should be appreciated that other configurations are also contemplated to be within the scope of this description. For example, electric motor 198 may be implemented as one or more electric motors that provide torque directly to wheels 200 instead of passing through a transmission 202.

The combined torque of engine 102 and electric motor 198 is applied to an input of transmission 202. Transmission 202 may be an automatic transmission that switches gears in accordance with a gear change command from the CTC module 114. An output shaft of transmission 202 is coupled to an input of a differential gear 204. Differential gear 204 drives axles and wheels 200. Wheel speed sensors 206 generate signals that indicate a rotation speed of their respective wheels 200.

The CTC module 114 estimates an engine output torque to provide based on received sensor signals and other parameters described herein. The CTC module 114 may adjust position of the throttle, air-fuel ratio, valve timing, fuel injection, etc. to provide the estimated engine output torque. Based on a desired engine output torque, the CTC module 114 controls engine devices such that a desired air flow, a desired fuel injection, and/or a desired spark timing is achieved. The desired engine output torque may be based on a vehicle operator (driver) request and/or may be controller based, such as a torque output request from a cruise control system. In particular, the CTC module 114 controls the torque output of the engine based on the coordinated torque control methods and systems of the present disclosure.

The sensor signals that are received by the CTC module 114 may include sensor signals from: the MAP sensor 184, the MAF sensor 186, the throttle position sensor 190, the IAT sensor 192, an accelerator pedal position sensor 195, or other sensors, such as the engine coolant temperature sensor 182, the engine speed sensor 180, an ambient temperature sensor 197, an oil temperature sensor 198, and a vehicle speed sensor 201.

The CTC module 114 communicates with the throttle actuator module 116 and a cruise control module. An example of a cruise control module is shown and described with respect to the embodiment of FIG. 3A. The CTC module 114 receives a throttle position signal from the throttle position sensor 190 and adjusts throttle position based on the throttle position signal. The CTC module 114 may control the throttle 112 using a throttle actuator based on a position of an accelerator pedal 193. The throttle actuator module 116 may include a motor or a stepper motor, which provides limited and/or coarse control of the throttle position.

The CTC module 114 may also control the throttle 112 using the throttle actuator based on input from the cruise control module, such as an axle torque request. The CTC module 114 also generates an effective pedal position signal, which represents a throttle position regardless of whether the vehicle operator is depressing the accelerator pedal 194 or the cruise control module is controlling the amount of throttle.

Air mass, volume, and pressure per cylinder may be determined and/or estimated based on signals from the sensors 184, 186. The CTC module 114 may determine a throttle area based on a desired MAP and a desired MAF, and may generate a control signal to control the throttle based on the throttle area. The desired MAP and MAF may be determined based on engine speed and torque request signals.

The engine system 100 may further include a barometric pressure sensor 208. The barometric pressure sensor 208 may be used to determine environmental conditions, which may be further used to determine a desired throttle area. The desired throttle area may correspond to a specific throttle position.

The CTC system 100 may also include various tables 210, which may be used when performing arbitration and/or when performing various functions associated with the modules of the CTC module 114. Example modules of the CTC 114 are shown and described with respect to the embodiment of FIG. 2. The tables 210 may include single-pulse mode tables 212 and multi-pulse mode tables 214. The tables may each be associated with one or more of the steps described with respect to the embodiment of FIG. 4.

Referring now also to FIG. 2, a CTC system 250 is shown. The CTC system 250 includes a CLO enable module 252 an arbitrator transition control module 254 and an engine torque control module 256. The CLO enable module 252 enables and disables a multi-pulse mode based on various inputs and when CLO is enabled. The arbitrator transition control module 254 provides a torque predicted final signal $T_{prf}$ and a torque immediate final signal $T_{imf}$. The torque request signals $T_{prf}$, $T_{imf}$ may be based on inputs received from a driver (vehicle operator) interpretation module 258, an engine capacity module 260, and a CLO torque reserve module 262. The term immediate may refer to torque that is available through adjustment in, for example, spark advance (gas engines) or fuel timing (diesel engines). The term immediate refers to a quick response in torque where the term predicted may refer to torque that is provided slower, such as through the adjustment in throttle control, boost control, egr control, phasor control, etc (manifold based). The engine torque control module 256 controls a phasor control module 264, a throttle control module 266 and a spark control module 268 based on inputs from the arbitrator transition control module 254, an engine torque estimator 270, and an air/fuel ratio module 272.

In operation the CLO enable module 252 receives a CLO enable signal CLO, a torque estimate signal $T_{EST}$, an engine speed signal RPM, a torque predicted signal $T_{pr}$, a torque immediate signal $T_{im}$, a torque capacity predicted signal $T_{prcap}$, and a torque immediate capacity signal $T_{imcap}$. The torque estimate signal $T_{EST}$ may be generated by the engine torque estimator 270. The engine torque estimator 270 may generate the torque estimate signal $T_{EST}$ as described in U.S. Pat. No. 6,704,638, which is incorporated herein by reference in its entirety.

The engine speed signal RPM may be generated by, for example, the engine speed sensor 180 of FIG. 1. The torque predicted signal $T_{pr}$ and the torque immediate signal $T_{im}$ may be referred to as torque request signals and be generated by the driver interpretation module 258. The torque capacity predicted signal $T_{prcap}$ and the torque immediate capacity signal $T_{imcap}$ may be generated by the engine capacity module 260.

The CLO enable module 252 generates a multi-mode enable signal MME that is provided to the arbitrator transition control module 254, the engine capacity module 260, the CLO torque reserve module 262, the phasor control module 264, the spark control module 268, the engine torque estimator 270, and the air/fuel ratio module 272. The multi-mode enable signal MME may also be provided to the driver interpretation module 258, the engine torque control module 256 and the throttle control module 266. The modules 252-272 may operate in the single pulse mode or the multi-pulse mode based on the multi-mode enable signal MME.

The arbitrator transition control module 254 generates the torque predicted final signal $T_{prf}$ and the torque immediate final signal $T_{imf}$ based on the torque predicted signal $T_{pr}$, the torque immediate signal $T_{im}$, the torque capacity predicted signal $T_{prcap}$, the torque immediate capacity signal $T_{imcap}$, and a torque reserve signal $T_{res}$. The torque reserve signal $T_{res}$ may be generated by the CLO torque reserve module 262 and based on, for example, a desired air per cylinder (DAPC) signal, engine speed, spark advance desired, coolant temperature, etc. The torque reserve signal $T_{res}$ may be based on a reserve torque at idle and a reserve torque at rest. See, for example, U.S. Pat. Application No. 61/173,785, which is incorporated herein by reference in its entirety.

The engine torque control module 256 generates the DAPC signal, a desired throttle area (DAREA) signal and a spark (timing) for torque management signal $S_{tm}$ based on the torque predicted final signal $T_{prf}$, the torque immediate final signal $T_{imf}$, a torque sensitivity vector $T_{sens}$, and an air/fuel command signal $AF_{com}$. The torque sensitivity vector $T_{sens}$ may be generated by the engine torque estimator 270, which may communicate with the engine capacity module 260. The air/fuel command signal $AF_{com}$ may be generated by the air/fuel ratio module 272. The DAPC signal, the DAREA signal and the spark torque management signal $S_{tm}$ are provided respectively to the phasor control module 264, the throttle control module 266, and the spark control module 268.

Referring now to FIGS. 3A and 3B, an exemplary engine control system 300 that provides coordinated torque control is shown. The embodiments disclosed herein may apply to other coordinated torque control systems. The engine control system 300 may be referred to as a CTC system or backbone. Any of the modules of the engine control system 300. FIGS. 3A and 3B join together to depict the complete functional block diagram. A first connector label "A" on FIG. 3A overlays a second connector label "A" on FIG. 3B. A first connector label "B" on FIG. 3A overlays a second connector label "B" on FIG. 3B. FIGS. 3A and 3B are collectively referred to as FIG. 3.

The engine control system 300 employs a torque request backbone module 302 that determines a propulsion torque demand and communicates the propulsion torque demand to a propulsion torque control module 304. Torque request backbone module 302 determines the propulsion torque demand based on inputs from various torque requesting modules 308-322 that are described below in more detail. The torque requesting modules 308-322 include modules that generate signals to affect the control of one or more of actuators $306_{1-P}$ (i.e. actuators 306), which alter engine torque. The propulsion torque demand represents the torque desired from an engine in order to satisfy requests from the torque requesting modules 308-322.

As an example, a CTC system may generate a throttle control signal based on an engine torque request and a throttle position signal generated by a throttle position sensor (TPS). The engine torque request may be based on a vehicle operator input, such as an accelerator pedal position. The CTC system commands one or more devices based on the engine torque request and the throttle position signal. The devices may include a camshaft phasor, an exhaust gas recirculation (EGR) valve, a turbo, etc. The CTC system may regulate operation of the devices to provide a desired output torque.

The propulsion torque control module 304 controls one or more of the actuators 306 based on the net propulsion torque demand. Actuators 306 affect the engine torque. Examples of the actuators 306 include: an ignition module that delivers an ignition spark to the engine according to a set ignition timing; a fuel injection module that delivers an appropriate amount of fuel to the engine at a set crankshaft angle; and an electronic throttle control module that adjusts, for example, a throttle valve angle.

Each of the torque requesting modules 308-322 may be categorized as either an axle torque requesting module or a propulsion torque requesting module. Axle torque requesting modules control at least one of vehicle speed and vehicle traction with the road surface. Propulsion torque requesting modules control the output torque of the engine and an electric motor. Example axle torque requesting modules are shown in FIG. 3A and include a pedal position sensing module 308, a driver torque request module 309, a cruise control torque request module 310, an adaptive cruise control torque request control module 312, and other axle toque request modules $314_{1-J}$. Example propulsion torque requesting modules 304 are shown in FIG. 3B and include a stall prevention module 316, an engine crank and stop module 318, an engine capacity protection module 320, and other propulsion torque request modules $322_{1-K}$.

The pedal position sensing module 308 generates a pedal position signal that indicates a vehicle acceleration requested by a vehicle operator. The driver torque request module 309 generates a driver torque request based on the pedal position signal. The driver torque request may also be based on a current engine speed and a current vehicle speed.

The cruise control torque request module 310 generates a cruise control torque request. The cruise control torque request represents an axle torque to maintain the vehicle at a set speed. The adaptive cruise control torque request module 312 may communicate with cruise control torque request module 310 to modify the cruise control torque request based on the environment surrounding the vehicle. For example, adaptive cruise control torque request module 312 may request a reduced axle torque. This request may be to decelerate the vehicle and/or maintain the vehicle at a minimum following distance behind a second vehicle while the cruise control is active.

Other axle torque requesting modules are represented by axle torque request modules $314_{1-J}$ are referred to collectively as axle torque request modules 314. A first example of an axle torque request module 314 is a traction/drag control module. The traction/drag control module determines axle torque changes to control positive wheel slip and negative wheel slip. Positive wheel slip refers to slip between a vehicle tire and a road surface due to excessive powertrain torque during acceleration. Negative wheel slip refers to slip between the vehicle tire and the road surface due to excessive braking axle torque during deceleration. The slip can be detected based on signals from wheel speed sensors.

Another example of an axle torque request module 314 is a vehicle over-speed protection module. The vehicle over-speed protection module determines a maximum axle torque limit to maintain vehicle speed below a predetermined speed limit.

Still another example of an axle torque request module 314 is a brake torque management module. The brake torque management module determines a maximum axle torque when vehicle brakes are applied. The maximum axle torque is the axle torque that can be provided without overcoming the brake torque of the vehicle brakes.

Yet another example of an axle torque request module 314 is a stability control module. The stability control module generates axle torque requests based on a yaw rate of the vehicle. A stability control module may be included in an electronic stability control system.

The torque request backbone module 302 includes an axle torque arbitration module 330 and a propulsion torque arbitration module 332. The axle torque arbitration module 330 receives the various torque requests and/or limits from driver torque request module 309, cruise control torque request module 310, axle torque request modules 314, and a torque cutoff control module 334 (shown in FIG. 3B).

In certain situations propulsion torque is minimized by momentarily turning off fuel and/or spark to an engine. The torque cutoff module 334 may be used to generate the torque requests for these situations, which can include at least one of a clutch fuel cutoff and a deceleration fuel cutoff. A clutch fuel cutoff occurs when the vehicle is equipped with a manual transmission and the vehicle operator disengages the clutch. The clutch fuel cutoff prevents the engine speed from increasing beyond a predetermined speed when the clutch disengages and removes a load from the engine. The deceleration fuel cutoff occurs when the vehicle is coasting above a predetermined speed. The deceleration fuel cutoff helps increase engine braking. Deceleration fuel cutoffs are also communicated to the axle torque arbitration module 330.

The axle torque arbitration module 330 generates a net axle torque request based on the torque requests and/or limits and communicates the net axle torque request to an axle-to-propulsion torque conversion module 3536. Axle-to-propulsion torque conversion module 336 converts the net axle torque request to a corresponding propulsion torque request, which may be provided to the propulsion torque arbitration module 332. The conversion may be based on a gear ratio of an axle differential gear, a diameter of a vehicle wheel, a gear ratio of a transmission, and a torque converter gain.

The axle torque arbitration module 330 may be configured for a hybrid electric vehicle. In a hybrid electric vehicle, the total axle torque request from the axle torque arbitration module 330 is communicated to a hybrid control module 340. The hybrid control module 340 may determine the amounts of propulsion torque to be provided by an electric motor and an engine. The hybrid control module 340 generates propulsion torque requests signals based on the determination, which are provided respectively to the propulsion torque arbitration module 332 and the electric motor. The axle to propulsion torque conversion module 336 may be combined with the hybrid control module 340. Also, the torque cutoff module 334 may communicate deceleration fuel cutoff torque requests to the hybrid control module 340 instead of to the axle torque arbitration module 332.

The propulsion torque arbitration module 332 generates a total requested propulsion torque based on the propulsion torque requests and/or limits from the various propulsion torque request modules, the axle torque arbitration module 330, and/or the hybrid control module 340. The propulsion torque arbitration module 332 communicates the total requested propulsion torque to propulsion torque control module 304. The propulsion torque arbitration module 332 receives propulsion torque requests from the propulsion torque request modules 316-322. The propulsion torque request modules $322_{1\text{-}K}$ are referred to collectively as propulsion torque request modules 322.

The stall prevention module 316 determines a minimum torque needed to maintain the engine in a running state. The stall prevention module 316 may increase the minimum torque based on input from the engine crank and stop module 318 and the engine capacity protection module 320.

The engine crank and stop module 318 increases the minimum torque request based on whether the engine is a new or green engine. A green engine refers to an engine that uses a fuel injection pulse width to purge air from a fuel system when the vehicle is first assembled. The engine crank and stop module 318 may also communicate with the propulsion torque arbitration module 304 to retard ignition timing and maintain a constant engine torque despite the increased fuel injector pulse width.

The engine capacity protection module 320 provides a maximum torque limit for an engine based on mechanical limitations of a powertrain. Example mechanical limitations include a maximum torque limit of a transmission and a maximum temperature limit of an exhaust catalyst.

An example of a propulsion torque request module 322 is a transmission torque request module that generates a torque request to reduce engine torque during transmission shifts. Other propulsion torque request modules 322 may include an engine over-speed protection module and an engine idle speed control module. The engine over-speed protection module determines a propulsion torque limit to prevent engine speed from exceeding a predetermined engine speed. The engine idle speed control module determines the propulsion torque needed to maintain an engine at a predetermined idle speed during coasting or at idle with a transmission in a drive or neutral gear.

The propulsion torque arbitration module 332 may also receive reserve torque requests from one or more reserve torque request modules $3550_{1\text{-}Q}$ are referred to collectively as reserve torque request modules 350. Reserve additional torque that may be provided from an engine. A first example of a reserve torque request module 350 is an air conditioning compressor torque compensation module. The air conditioning compressor torque compensation module requests a reserve torque to maintain a constant engine speed when a compressor clutch engages and disengages.

Another example of a reserve torque request module 350 is a catalyst light-off module. When an engine is started and has a temperature that is less than a certain temperature, the catalyst light-off module requests engine spark to be retarded to increase exhaust gas temperature and heat an exhaust catalyst to a conversion temperature. The catalyst light-off module may also request that a throttle opening be increased while the spark is retarded to compensate for any associated torque loss.

Another example of a reserve torque request module 350 is an intrusive diagnostic module. An intrusive diagnostic module, such as an idle catalyst monitor, may change an air/fuel ratio of an engine to perform a diagnostic test. This change in the air/fuel ratio may alter torque output of an engine. The intrusive diagnostic module may request a reserve torque to compensate for this change in torque output.

Figure 4:
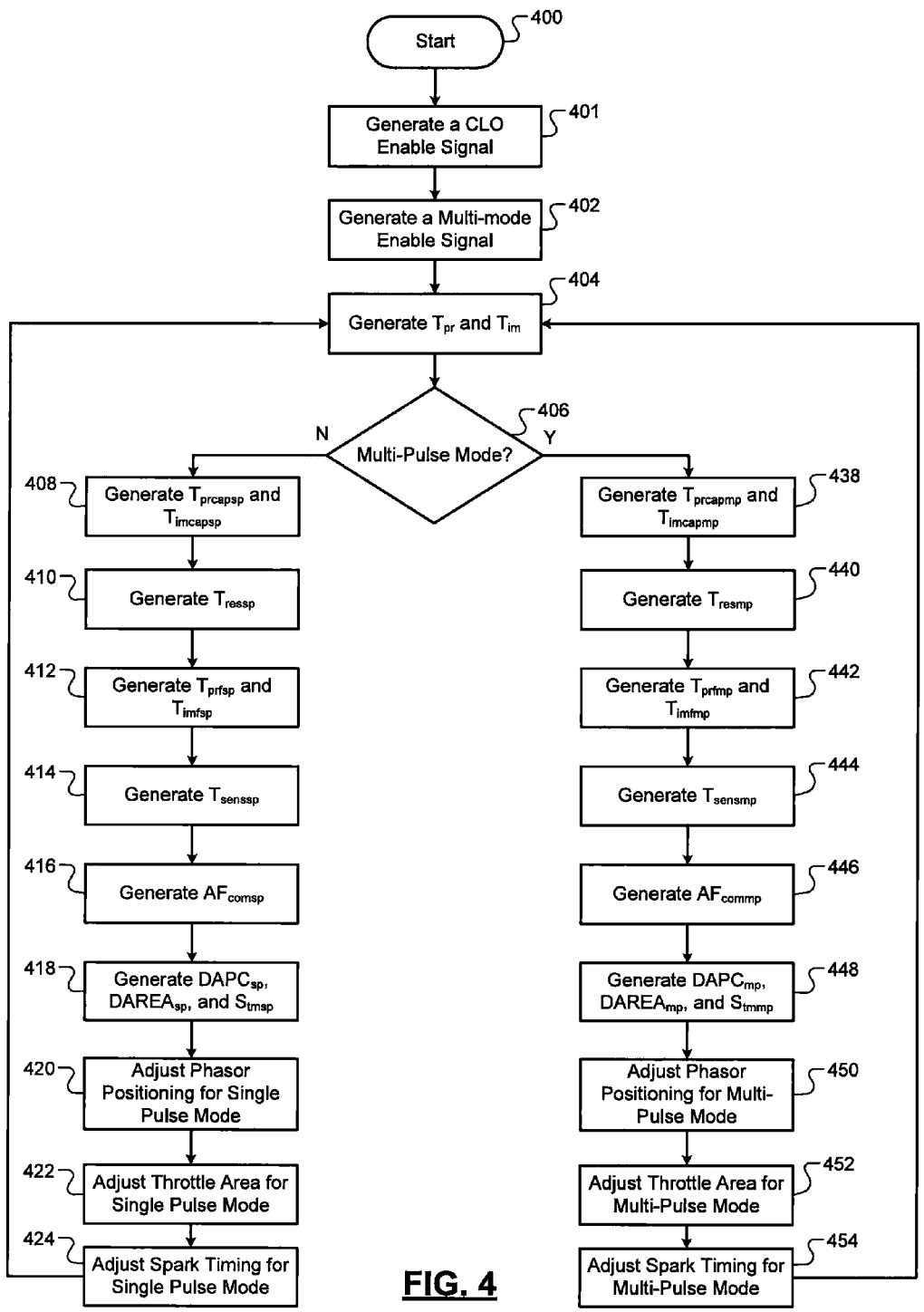
FIG. 4 illustrates a coordinated torque control method according to an embodiment of the present disclosure.

Referring now to FIG. 4, a coordinated torque control method is shown. Although the following steps are described primarily with respect to the embodiment of FIG. 2, the steps may be modified and/or applied to other embodiments of the present disclosure. In the following steps, various signals are generated and functions are presented. The signals may each be generated and the functions may each be based on an associated table, such as one of the tables 210 of FIG. 1. Also, various modules are described. The various modules may be included in, for example, the torque request backbone module 302 of FIGS. 3A and 3B and/or in one of the arbitration modules included therein. The method may begin at step 400.

In step 401, a CLO enable signal. The CLO enable signal may be generated, for example, based on exhaust temperatures, oxygen sensor signals, air flow, exhaust pressures, engine start/stop times, coolant temperature, engine run time, etc.

In step 402, a CLO enable module generates, for example, the multi-mode signal MME that indicates operation in a signal pulse mode or a multi-pulse mode. The multi-mode signal MME may be generated based on, for example, the CLO enable signal CLO, the torque estimate signal $T_{EST}$, the engine speed signal RPM, the torque predicted signal $T_{pr}$, the torque immediate signal $T_{im}$, the torque predicted capacity signal $T_{prcap}$, and the torque immediate capacity signal $T_{imcap}$.

In one embodiment, the multi-mode signal MME is generated based on the CLO enable signal CLO, a torque request being less than a predetermined maximum torque output, and the engine speed signal RPM indicating a current engine speed within a predetermined engine speed range. For example only, the multi-mode signal may indicate operation in the multi-pulse mode when a torque request is less than the predicted maximum torque output for a multi-pulse mode and when the current engine speed is within the predetermined engine speed range. An example engine speed range is approximately 1200-1600 revolutions-per-minute. The torque request may be based on the torque predicted signal $T_{pr}$ the torque immediate signal $T_{im}$. The multi-mode signal MME may be generated based on engine load.

For example only, control may determine whether to stay in the multi-pulse mode based on accelerator pedal positioning, transmission engagement state, flywheel load (brake torque), maximum available engine torque, spark advance for the multi-pulse mode, engine load, etc. For example only, control may remain in the multi-pulse mode when a first sum is greater than a second sum for the multi-pulse mode, as provided by expression 1. The first sum may be equal to a brake torque BT plus a torque reserve (such as the torque reserve $T_{res}$). The second sum may be equal to a maximum engine capacity $EC_M$ plus a calibration offset $Cal_{OFF}$. When expression 1 is true, control may operate in and/or transition to the single pulse mode. The calibration offset $Cal_{OFF}$ may be used to allow control to adjust the timing of when to cease operation in the multi-pulse mode.

$$BT+T_{res}>EC_M+Cal_{OFF} \qquad (1)$$

As an alternative control may determine whether to stay in the multi-pulse mode as described in U.S. Pat. Application No. 61/173,785, which is incorporated herein by reference in its entirety.

In step 404, a driver interpretation module may generate, for example, the torque predicted signal $T_{pr}$ and the torque immediate signal $T_{im}$. The torque predicted signal $T_{pr}$ and the torque immediate signal $T_{im}$ may be generated based on one or more drive input signals, such as from an accelerator pedal sensor, cruise control, etc. As an example, the torque immediate signal $T_{im}$ may be used to adjust spark timing. The torque predicted signal $T_{pr}$ may be used to adjust throttle area, throttle position and/or intake/exhaust boost.

In step 406, control proceeds to step 408 when the multi-mode enable signal MME indicates operation in the single pulse mode and proceeds to step 438 when the multi-mode enable signal MME indicates operation in the multi-pulse mode.

In step 408, an engine capacity module generates, for example, a torque capacity predicted signal $T_{prcapsp}$ and a torque immediate capacity signal $T_{imcapsp}$. The engine capacity module may generate maximum and/or minimum torque, air per cylinder, spark timing, intake phasor position, and exhaust phasor position information for the single pulse mode. The torque capacity predicted signal $T_{prcapsp}$ and the torque immediate capacity signal $T_{imcapsp}$ may be generated based on the maximum information, as provided by expressions 7-8. For example, an engine speed R, a maximum torque $T_{MAXsp}$, a maximum air per cylinder $A_{MAXsp}$, a maximum spark timing value $S_{MAXsp}$, a maximum intake phasor position $I_{MAXsp}$, and a maximum exhaust phasor position $E_{MAXsp}$ may be determined based on the following expressions 2-6. sp refers to single pulse mode. BARO refers to barometric pressure, which may be generated based on a signal from a barometric pressure sensor.

$$T_{MAXsp}=f(R,A_{MAXsp},S_{MAXsp},I_{MAXsp},E_{MAXsp}) \qquad (2)$$

$$A_{MAXsp}=VE_{MAXsp}*BARO \qquad (3)$$

$$S_{MAXsp}=f(R,A_{MAXsp}) \qquad (4)$$

$$I_{MAXsp}=f(R,A_{MAXsp}) \qquad (5)$$

$$E_{MAXsp}=f(R,A_{MAXsp}) \qquad (6)$$

$$T_{prcapsp}=f(T_{MAXsp},A_{MAXsp},S_{MAXsp},I_{MAXsp},E_{MAXsp}) \qquad (7)$$

$$T_{imcapsp}=T_{prcapsp}-T_{RESsp} \qquad (8)$$

In step 410, a CLO torque reserve module generates, for example, a torque reserve signal $T_{ressp}$. The torque reserve signal $T_{ressp}$ may be generated per expression 9. A torque reserve for the multi-pulse mode may be greater than for the single pulse mode. For example, spark timing may be more retarded or less advanced in the multi-pulse mode than in the single pulse mode. In one embodiment, spark timing is at a minimum spark for best torque output value $S_{MBT}$ when in the single pulse mode, and is at a negative spark advance value when in the multi-pulse mode.

The minimum spark for best torque output value $S_{MBT}$ refers to a minimally advanced spark timing value that provides a maximum amount of torque output. Advancing spark timing past the minimum spark for best torque output value $S_{MBT}$ does not provide increase torque output. The minimum spark for best torque output value $S_{MBT}$ is provided when the torque predicted signal $T_{pr}$ is equal to the torque immediate signal $T_{im}$ or when torque reserve is equal to zero. Torque predicted may be equal to torque immediate plus torque reserve.

$$T_{ressp}=f_{sp}(R,DAPC) \qquad (9)$$

In step 412, an arbitrator transition control module may generate a torque predicted final signal $T_{prfsp}$ and a torque immediate final single $T_{imfsp}$ based on torque predicted signal $T_{pr}$, the torque immediate signal $T_{im}$, the torque capacity predicted signal $T_{prcapsp}$, the torque immediate capacity signal $T_{imcapsp}$, and the torque reserve signal $T_{ressp}$. The arbitrator transition control module may control transitioning between the single pulse mode and the multi-pulse mode. See, for example, U.S. Pat. Application No. 61/173,785, which is incorporated herein by reference in its entirety.

In step 414, an engine torque estimator may generate a torque sensitivity vector $T_{senssp}$ for the single pulse mode. Torque sensitivity may be determined as described in U.S. Pat. No. 6,704,638. For example only, the torque sensitivity vector $T_{senssp}$ may be determined as provided by expression 10. A first set of coefficient values may be used for the single mode and a different or second set of coefficient values may be used for the multi-pulse mode. Torque output $T_{Osp}$ of the engine may be determined using a Taylor series. The torque output $T_{Osp}$ may be determined using expression 11, where $a_A(R,I_{sp},E_{sp})$ may be referred to as the sensitivity for the single pulse mode. $a_A$, $a_{A^2}$, ... and $a_S$, $a_{S^2}$, ... are coefficient values.

$$T_{senssp}=f(R,I_{sp},E_{sp},A_{sp},S_{sp}) \qquad (10)$$

$$T_{Osp}=a_A(R,I_{sp},E_{sp})A+a_{A^2}(R,I_{sp},E_{sp})A^2+\ldots+a_S(R,I_{sp},E_{sp})S+a_{S^2}(R,I_{sp},E_{sp})S^2+ \qquad (11)$$

In step 416, an air/fuel ratio module may generate an air/fuel command signal $AF_{comsp}$. The air/fuel command signal $AF_{comsp}$ may include an equivalence ratio $EQR_{sp}$ as provided by expression 12, where COOL is coolant temperature and IVT is an intake valve temperature. The air/fuel ratio may be set at or near a stoichiometric combustion ratio, which may be, for example, 14.7:1.

$$EQR_{sp}=f(COOL,IVT) \qquad (12)$$

In step 418, an engine torque control module may generate a desired air per cylinder signal $DAPC_{sp}$, a desired throttle area signal $DAREA_{sp}$, and a spark control signal $S_{tmsp}$ based on the torque sensitivity vector $T_{senssp}$, the torque predicted final signal $T_{prfsp}$, the torque immediate final signal $T_{imfsp}$, and the air/fuel command signal $AF_{comsp}$. Torque control may include different integral gains for the single pulse mode than the multi-pulse mode.

In step 420, a phase control module may control phasor positioning based on the desired air per cylinder signal DAPC$_{sp}$. As an example, intake and exhaust phasor positioning may be based on expressions 13-14.

$$I_{sp}=f_{sp}(R,DAPC) \quad (13)$$

$$E_{sp}=f_{sp}(R,DAPC) \quad (14)$$

When transitioning between the single and multi-pulse modes, a ramping strategy may be used for camshaft phasors and for torque reserve. For example, when transitioning from the single pulse mode to the multi-pulse mode, phasor positions may be ramped to desired positions, air flow may be ramped out (decreased) and spark timing may be increased. This slows down the transition. As another example, phasor positions, air flow, and spark timing may be adjusted before transitioning such that the current phasor positions, air flow and spark timing are proper for stable combustion in either the single pulse mode or the multi-pulse mode. A transition may then be performed between the signal and multi-pulse modes without a change in engine torque output. The single pulse mode may have a different phasor schedule than the multi-pulse mode. In each of the single and multi-pulse modes combustion efficiency is adjusted to minimize emissions. Transitioning between single and multi-pulse modes may be performed as described in U.S. Pat. Application No. 61/173,785, which is incorporated herein by reference in its entirety In step 422, a throttle control module may adjust throttle position based on the desired throttle area signal DAREA$_{sp}$. Air flow may be adjusted when transitioning between single and multi-pulse modes. For example air flow may be increased when spark is advanced for the single pulse mode.

In step 424, a spark control module may adjust spark timing based on the spark control signal S$_{tmsp}$. For example only, expressions 15-17 may be used to determine and set spark timing. S$_{minsp}$ refers to spark timing minimum for the single pulse mode, S$_{sp}$ refer to a current spark timing or desired spark timing, S$_{ascalsp}$ refers to spark timing as calibrated, S$_{EQRsp}$ refers to spark timing based on the equivalence ratio EQR$_{sp}$, and S is a spark timing function. The calibrated spark timing S$_{ascalsp}$ may be equal to a minimum spark for best torque output value S$_{MBT}$.

$$S_{minsp}(R,A_{sp},I_{sp},E_{sp}) \leq S_{sp} \leq S_{ascalsp}(R,A_{sp},I_{sp},E_{sp}) \quad (15)$$

$$S_{sp}=S_{ascalsp}-S_{EQR}-S_{TM} \quad (16)$$

$$S_{EQRsp}=S(R,EQR_{sp}) \quad (17)$$

When transitioning between single pulse and double pulse modes the spark timing may be altered. The spark timing range for the single pulse mode may be different than the spark timing range for the multi-pulse mode. As an example, a single pulse spark operating range may be from −5° before top-dead-center (DBTDC) to minimum spark before best torque. An example multi-pulse spark operating range is from −20° DBTDC to a maximum spark advance for multi-pulse mode. Also, the amount of retarding spark may be different for single and multi-pulse modes.

After step 424, control may return to steps 401 and/or 402 to generate an updated CLO enable signal and/or an updated multi-mode enable signal. Alternatively, control may return to step 404, as shown. A CLO enable signal and/or a multi-mode enable signal may be generated during any of steps 402-424. As a result, control may return to step 404 and switch from operating in the single pulse mode to operating in the multi-pulse mode during or after any one of steps 402-424.

In step 438, the engine capacity module generates, for example, a torque capacity predicted signal T$_{prcapmp}$ and a torque immediate capacity signal T$_{imcapmp}$. The torque capacity predicted signal T$_{prcapmp}$ and the torque immediate capacity signal T$_{imcapmp}$ may be generated based on maximum and/or minimum information, an example of which is provided by expressions 23-24. For example, a maximum torque T$_{MAXmp}$, a maximum air per cylinder A$_{MAXmp}$, a maximum spark timing value S$_{MAXmp}$, a maximum intake phasor position I$_{MAXmp}$, and a maximum exhaust phasor position E$_{MAXmp}$ may be determined based on the following expressions 18-22. mp refers to multi-pulse mode. The functions provided in expressions 18-22 may be formula based, table based, etc.

$$T_{MAXmp}=f(R,A_{MAXmp},S_{MAXmp},I_{MAXmp},E_{MAXmp}) \quad (18)$$

$$A_{MAXmp}=VE_{MAXmp}*BARO \quad (19)$$

$$S_{MAXmp}=f(R,A_{MAXmp}) \quad (20)$$

$$I_{MAXmp}=f(R,A_{MAXmp}) \quad (21)$$

$$E_{MAXmp}=f(R,A_{MAXmp}) \quad (22)$$

$$T_{prcapmp}=f(T_{MAXmp},A_{MAXmp},S_{MAXmp},I_{MAXmp},E_{MAXmp}) \quad (22)$$

$$T_{imcapmp}=T_{prcapmp}-T_{RESmp} \quad (23)$$

In step 440, the CLO torque reserve module generates, for example, a torque reserve signal T$_{resmp}$. The torque reserve signal T$_{resmp}$ may be generated per expressions 24-26, where T$_{un}$ is unmanaged torque that may be generated by an engine torque estimation module, T$_b$ is based torque that is a function of engine speed R, intake and exhaust camshaft phasor positioning I, E, spark advance S, and air per cylinder A. T$_P$ is proportional torque.

$$T_{resmp}=T_{un}-T_b \quad (24)$$

$$T_b=f(R,I,E,S,A) \quad (25)$$

$$TC_{im}=T_{un}-T_R+T_P \quad (26)$$

The torque reserve signal T$_{resmp}$ may be further generated as described in U.S. Pat. Application No. 61/171,535, which is incorporated herein by reference in its entirety.

In step 442, the arbitrator transition control module generates a torque predicted final signal T$_{prfmp}$ and a torque immediate final single T$_{imfmp}$ based on torque predicted signal T$_{pr}$, the torque immediate signal T$_{im}$, the torque capacity predicted signal T$_{prcapmp}$, the torque immediate capacity signal T$_{imcapmp}$, and the torque reserve signal T$_{resmp}$. The arbitrator transition control module may control transitioning between the single pulse mode and the multi-pulse mode.

In step 444, the engine torque estimator may generate a torque sensitivity vector T$_{sensmp}$ for the single pulse mode. Torque sensitivity may be determined as described in U.S. Pat. No. 6,704,638. For example only, the torque sensitivity vector T$_{sensmp}$ may be determined as provided by expression 27. Torque output T$_{Omp}$ of the engine may be determined using a Taylor series. The Torque output T$_{Omp}$ may be determined using expression 28, where b$_A$(R,I$_{mp}$,E$_{mp}$) may be referred to as the sensitivity for the multi-pulse mode. b$_A$, b$_{A^2}$, ... and b$_S$, b$_{S^2}$, ... are coefficient values.

$$T_{sensmp}=f(R,I_{mp},E_{mp},A_{mp},S_{mp}) \quad (27)$$

$$T_{sensmp}=b_A(R,I_{mp},E_{mp})A+b_{A^2}(R,I_{mp},E_{mp})A^2+\ldots+b_S(R,I_{mp},E_{mp})S+b_{S^2}(R,I_{mp},E_{mp})S^2+ \quad (28)$$

In step 446, the air/fuel ratio module may generate an air/fuel command signal AF$_{commp}$. The air/fuel command signal AF$_{commp}$ may include an equivalence ratio EQR$_{mp}$ as provided by expression 29. The air/fuel ratio module commands an air/fuel ratio that operates the engine in a lean mode.

A lean mode refers to an air/fuel ratio that is greater than a stoichiometric combustion ratio. An example lean mode ratio is 19:1.

$$EQR_{mp}=f(COOL,IVT) \quad (29)$$

In step 448, the engine torque control module may generate a desired air per cylinder signal $DAPC_{mp}$, a desired throttle area signal $DAREA_{mp}$, and a spark control signal $S_{tmmp}$ based on the torque sensitivity vector $T_{sensmp}$, the torque predicted final signal $T_{prfmp}$, the torque immediate final signal $T_{imfmp}$, and the air/fuel command signal $AF_{commp}$.

In step 450, the phase control module may control phasor positioning based on the desired air per cylinder signal $DAPC_{mp}$. As an example, intake and exhaust phasor positioning may be based on expressions 30-31.

$$I_{mp}=f_{mp}(R,DAPC) \quad (30)$$

$$E_{mp}=f_{mp}(R,DAPC) \quad (31)$$

When transitioning between the single and multi-pulse modes, a ramping strategy as described above in step 420 may be used.

In step 452, a throttle control module may adjust throttle position based on the desired throttle area signal $DAREA_{mp}$. Air flow may be adjusted when transitioning between single and multi-pulse modes. For example air flow may be decreased when spark is retarded for the multi-pulse mode.

In step 454, a spark control module may adjust spark timing based on the spark control signal $S_{tmmp}$. For example only, expressions 32-34 may be used to determine and set spark timing. $S_{minmp}$ refers to spark timing minimum for the single pulse mode, $S_{mp}$ refer to a current spark timing or desired spark timing, $S_{ascalmp}$ refers to spark timing as calibrated, $S_{EQRsp}$ refers to spark timing based on the equivalence ratio $EQR_{mp}$, and S is a spark timing function.

$$S_{minmp}(R,A_{mp},I_{mp},E_{mp}) < S_{mp} < S_{ascalmp}(R,A_{mp},I_{mp},E_{mp}) \quad (32)$$

$$S_{mp}=S_{ascalmp}-S_{EQR}-S_{TM} \quad (33)$$

$$S_{EQRmp}=S(R,EQR_{mp}) \quad (34)$$

After step 454, control may return to steps 401 and/or 402 to generate an updated CLO enable signal and/or an updated multi-mode enable signal. Alternatively, control may return to step 404, as shown. A CLO enable signal and/or a multi-mode enable signal may be generated during any of steps 438-454. As a result, control may return to step 404 and switch from operating in the multi-pulse mode to operating in the single pulse mode during or after any one of steps 438-454. As an example, control may switch from the multi-pulse mode to the single pulse mode when the catalyst is up to a predetermined temperature, when the CLO mode has been active for a predetermined period of time, when the oxygen levels in the exhaust gas are within a predetermined range, etc.

The above-described steps are meant to be illustrative examples; the steps may be performed sequentially, synchronously, simultaneously, continuously, during overlapping time periods or in a different order depending upon the application.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system comprising:
    a catalyst module that generates a multi-mode enable signal based on a catalyst light off enable signal;
    a transition control module that controls transitions between a single pulse mode and a multi-pulse mode based on the multi-mode enable signal, that receives a first torque signal, and that generates a second torque signal based on the first torque signal; and
    an engine torque control module that generates an air per cylinder signal, a throttle area signal, and a spark timing signal based on the second torque signal,
    wherein the single pulse mode is associated with a single fuel injection pulse per combustion cycle and the multi-pulse mode is associated with multiple fuel injection pulses per combustion cycle.

2. The control system of claim 1 further comprising a driver interpretation module that generates the first torque signal, which includes a torque predicted signal and a current available torque signal.

3. The control system of claim 2 wherein the engine torque control module generates the air per cylinder signal, the throttle area signal, and the spark timing control signal based on the torque predicted signal and the current available torque signal.

4. The control system of claim 1 further comprising an engine capacity module that generates a first torque capacity signal based on the multi-mode enable signal,
    wherein the transition control module generates the second torque signal based on the first torque capacity signal.

5. The control system of claim 4 wherein the first torque capacity signal includes a torque predicted capacity signal and a current torque capacity available signal.

6. The control system of claim 5 wherein the catalyst module generates the multi-mode enable signal based on the first torque capacity signal.

7. The control system of claim 1 further comprising a torque reserve module that generates a torque reserve signal based on the multi-mode enable signal and an air per cylinder signal.

8. The control system of claim 1 further comprising an engine torque estimator that generates a first torque sensitivity vector when operating in the signal pulse mode and a second torque sensitivity vector when operating in the multi-pulse mode,
    wherein the engine torque control module generates the air per cylinder signal, the throttle area signal, and the spark timing signal based on the first torque sensitivity vector and the second torque sensitivity vector.

9. The control system of claim 1 further comprising a phasor control module that adjusts phasor positioning based on the multi-mode enable signal and the air per cylinder signal.

10. The control system of claim 1 further comprising a spark control module that adjust spark timing based on the multi-mode enable signal and the spark timing signal.

11. The control module of claim 1 further comprising an air fuel ratio module that generates a first air and fuel command signal when operating in the single pulse mode and a second air and fuel command signal when operating in the multi-pulse mode,
    wherein the engine torque control module generates the air per cylinder signal, the throttle area signal, and the spark timing signal based on one of the first air and fuel command signal and the second air and fuel command signal.

12. A control system comprising:
a catalyst module that generates a multi-mode enable signal based on a catalyst light off enable signal;
a torque reserve module that selectively operates in one of a single pulse mode and a multi-pulse mode based on the multi-mode enable signal and that generates a first torque reserve signal based on operation in one of the single pulse mode and the multi-pulse mode; and
an engine torque control module that generates an air per cylinder signal, a throttle area signal, and a spark timing signal based on a first torque request signal that is generated based on the first torque reserve signal,
wherein the single pulse mode is associated with a single fuel injection pulse per combustion cycle and the multi-pulse mode is associated with multiple fuel injection pulses per combustion cycle.

13. The control system of claim 12 further comprising a transition control module that controls transitions between the single pulse mode and the multi-pulse mode based on the multi-mode enable signal, that receives a second torque request signal, and that generates the first torque request signal based on the second torque request signal.

14. The control system of claim 13 wherein the first torque request signal includes a first torque predicted signal and a first current available torque signal, and
wherein the second torque request signal includes a second torque predicted signal and a second current available torque signal.

15. The control system of claim 12 further comprising an engine torque estimator that operates in one of the single pulse mode and the multi-pulse mode based on the multi-pulse mode enable signal, that generates a first torque sensitivity vector based on a first set of coefficient values when in the single pulse mode, and that generates a second torque sensitivity vector based on a second set of coefficient values when in the multi-pulse mode.

16. A control system comprising:
a catalyst module that generates a multi-mode enable signal based on a catalyst light off enable signal;
an engine torque estimator that selectively operates in one of a single pulse mode and a multi-pulse mode based on the multi-mode enable signal and that generates a first torque sensitivity vector based on operation in one of the single pulse mode and the multi-pulse mode; and
an engine torque control module that generates an air per cylinder signal, a throttle area signal, and a spark timing signal based on the first torque sensitivity vector,
wherein the single pulse mode is associated with a single fuel injection pulse per combustion cycle and the multi-pulse mode is associated with multiple fuel injection pulses per combustion cycle.

17. The control system of claim 16 further comprising a transition control module that controls transitions between the single pulse mode and the multi-pulse mode based on the multi-mode enable signal, that receives a first torque request signal, and that generates a second torque request signal based on the first torque request signal.

18. The control system of claim 16 further comprising a torque reserve module that generates a first torque reserve signal when operating in the single pulse mode and that generates a second torque reserve signal when operating in the multi-pulse mode,
wherein the engine torque control module generates the air per cylinder signal, the throttle area signal, and the spark timing signal based on a torque request signal that is generated based on one of the first torque reserve signal and the second torque reserve signal.

19. The control system of claim 15 wherein the catalyst module generates the multi-mode enable signal based on a first torque predicted signal, a first current torque available signal, a first torque capacity signal, a second torque capacity signal, and an engine speed signal.

20. The control system of claim 19 further comprising:
an engine capacity module that generates the first torque capacity signal and the second torque capacity signal; and
a transition control module that generates a second torque predicted signal and a second current torque available signal based on the first torque predicted signal, the first current torque available signal, the first torque capacity signal and the second torque capacity signal,
wherein the engine torque control module generates the air per cylinder signal, the throttle area signal, and the spark timing signal based on the second torque predicted signal and the second current torque available signal.

* * * * *